July 26, 1932. W. D. WILLIAMS 1,868,557
FENCE POST
Filed Feb. 2, 1931
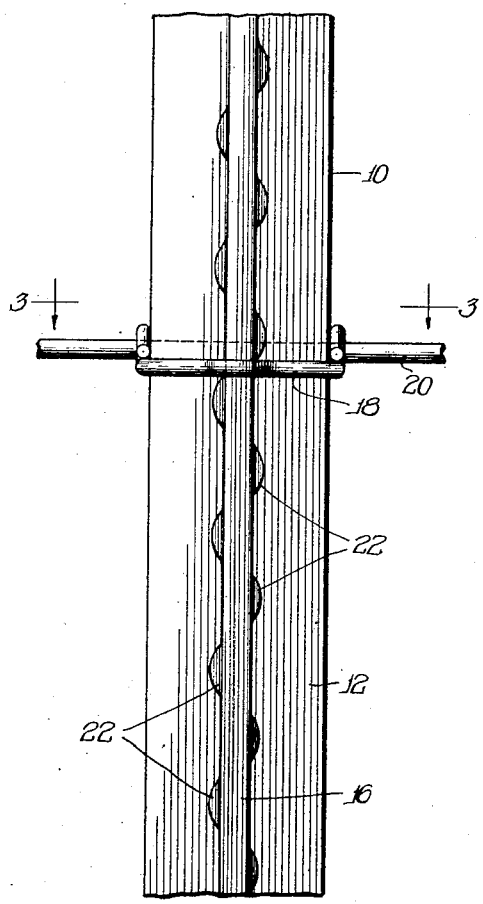
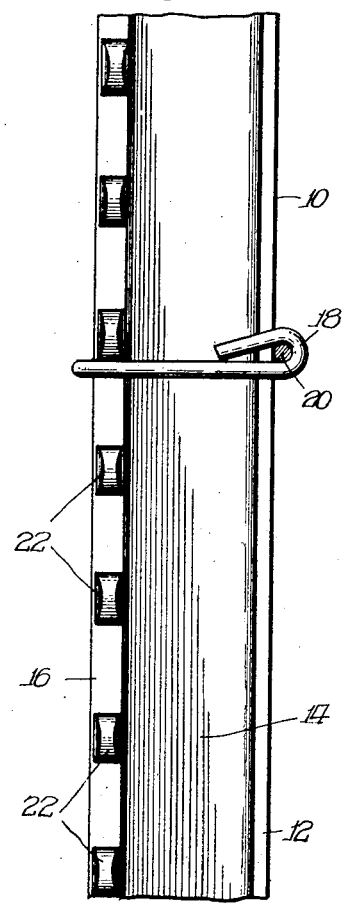
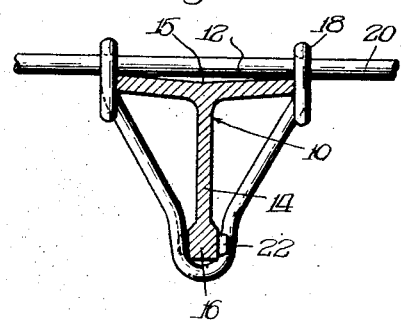
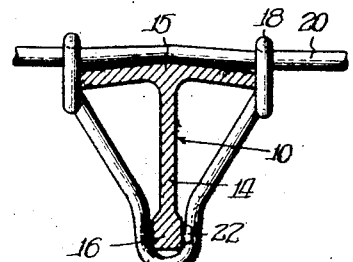
Inventor,
William D. Williams, Patented July 26, 1932

1,868,557

UNITED STATES PATENT OFFICE

WILLIAM D. WILLIAMS, OF DULUTH, MINNESOTA

FENCE POST

Application filed February 2, 1931. Serial No. 513,013.

This invention relates to fence posts and the like and is disclosed herein as embodied in a novel type of post made of a rolled section. The various features and advantages of the invention will be brought out from a reading of the following specification and a study of the appended drawing, in which Figure 1 is a view of the rear of the post.

Figure 2 is a view of the side of the post shown in Figure 1.

Figure 3 is a vertical section taken along the line 3—3 of Figure 1.

Figure 4 is a vertical section of a somewhat modified form of post.

As shown in the drawing, the reference numeral 10 indicates generally a fence post that is T-shaped in cross section and comprices a head 12 and a stem 14 having a bulb 16, polygonal in cross section, formed thereon. The bulb is for strengthening purposes and is covered by a patent assigned to a company with which is affiliated the patentee of the instant application. The face 15" is slightly concaved as shown in Figure 3 to permit the passage of rain water and dust between the horizontal wire and the face of the post whereby to prevent the accumulation at the line of junction of the wire with the post of dust, dirt, rain water and the like.

As shown in Figure 4, the outer face 15 of the head 12 is of convex formation for the purpose of affording an extremely tight fit between the post and the horizontal wire 20.

As is customary the fence post is provided with means for co-operating with a wire clip 18 which holds and prevents vertical displacement of horizontally extending fence wires 20 and as herein disclosed such means comprise projections 22 rolled on opposite sides of the bulb of the T. The projections are elongated with major axes extending lengthwise of the bulb and are spaced apart by a distance greater than their own length. It is to be appreciated that the projections may be used on posts that are provided or not provided with bulbs and their use on a post of the bulb type serves substantially to reinforce the post and upon a post not having a bulb the projections may be said to serve as a substitute reinforcement therefor.

Having thus described my invention, what I claim as new and desire to secure by Letters Patent is:

1. A rolled section suitable for fence posts and the like, said section being approximately T-shaped in cross section, the stem of the T being formed with a bulb polygonal in cross section and the bulb having projections on its opposite sides.

2. A rolled section suitable for fence posts and the like, said section being approximately T-shaped in cross section, the stem of the T being formed with a bulb polygonal in cross section and having projections on its opposite sides, said projections on the opposite sides being separated from one another by a distance greater than the length of the projections.

Signed at Duluth, Minnesota, this 8th day of January, 1931.

WILLIAM D. WILLIAMS.